US012500056B2

United States Patent
Yee

(12) United States Patent

(10) Patent No.: US 12,500,056 B2

(45) Date of Patent: Dec. 16, 2025

(54) TOOL FOR FUSE REMOVAL AND INSTALLATION

(71) Applicant: Raytheon Company, Tewksbury, MA (US)

(72) Inventor: Chang J. Yee, Stow, MA (US)

(73) Assignee: Raytheon Company, Arlington, VA (US)

(*) Notice: Subject to any disclaimer, the term of this patent is extended or adjusted under 35 U.S.C. 154(b) by 45 days.

(21) Appl. No.: 18/388,212

(22) Filed: Nov. 9, 2023

(65) Prior Publication Data

US 2024/0079195 A1 Mar. 7, 2024

Related U.S. Application Data

(62) Division of application No. 17/213,413, filed on Mar. 26, 2021, now Pat. No. 11,842,859.

(51) Int. Cl.

*B25B 27/00* (2006.01)
*B25B 9/02* (2006.01)
*H01H 85/02* (2006.01)

(52) U.S. Cl.

CPC ........... *H01H 85/0208* (2013.01); *B25B 9/02* (2013.01); *B25B 27/0035* (2013.01)

(58) Field of Classification Search

CPC .. H01H 85/0208; B25B 9/02; B25B 27/0035; B25B 27/00; B25B 27/20; B25B 7/00; B25B 7/02; B25B 27/205; Y10T 29/5363

USPC ........ 269/3, 6, 95; 29/268, 229, 239; 81/3.8, 81/53.1; 294/118

See application file for complete search history.

(56) References Cited

U.S. PATENT DOCUMENTS 2,430,544 A * 11/1947 Walker ............... H01H 85/0208 81/3.8
2,454,878 A 11/1948 Marler
3,161,085 A 12/1964 Pratt
3,195,380 A * 7/1965 Bicks ................ H01H 85/0208 269/254 R
3,973,318 A 8/1976 Strachan
4,541,311 A 9/1985 Trammell
4,671,588 A 6/1987 Fritsch et al.
4,841,819 A 6/1989 Williams

FOREIGN PATENT DOCUMENTS

KR 20050053097 A * 6/2005 ......... H01H 85/0208

OTHER PUBLICATIONS

International Search Report and Written Opinion dated Jul. 2, 2022 for corresponding application PCTUS2022/021518.
Office Action issued May 24, 2023 in counterpart Taiwan Patent Application No. 111111244 with English translation.

* cited by examiner

*Primary Examiner* — David S Posigian
*Assistant Examiner* — Tyler James Mcfarland
(74) *Attorney, Agent, or Firm* — Bachman & LaPointe, P.C.

(57) ABSTRACT

A tool for the removal or installation of a fuse includes a first tool arm and a second tool arm pivotally mounted to the first tool arm about an axis. A second fuse holder spreader finger section is movable away from a first fuse holder spreader finger section and a second fuse pusher finger section is movable toward a first fuse pusher finger section in response to a first handle section being moved toward a second handle section.

5 Claims, 5 Drawing Sheets

TOOL FOR FUSE REMOVAL AND INSTALLATION

CROSS-REFERENCE TO RELATED APPLICATION

This application is a divisional of U.S. patent application Ser. No. 17/213,413 filed Mar. 26, 2021.

GOVERNMENT LICENSE RIGHTS

This invention was made with government support under FA8730-17-C-0010 awarded by the United States Air Force. The government has certain rights in the invention.

BACKGROUND

The present disclosure relates to tools, and more particularly to a tool to remove and install a fuse without damaging the supporting structure therefor.

Fuses are widely used as overcurrent protection devices. The continued miniaturization of electronic components and the resultant denser arrangement of components on circuit card assemblies in locations that may be difficult to access complicates fuse removal and installation.

Although various fuse puller tools are available, such tools may require significant effort to extract the fuse from the fuse holder spring clip. This complicates fuse removal and may result in damage to the circuit card assembly. Prying action may also typically be needed with such tools and this prying action increases the risk of damage to the fuse holder spring clip during fuse removal.

SUMMARY

A tool according to one disclosed non-limiting embodiment of the present disclosure includes a first tool arm comprising a first handle section, a first fuse holder spreader finger section and first fuse pusher finger section; and a second tool arm pivotally mounted to the first tool arm about an axis, the second tool arm comprising a second handle section, a second fuse holder spreader finger section and a second fuse pusher finger section, the second fuse holder spreader finger section movable away from the first fuse holder spreader finger section and the second fuse pusher finger section movable toward the first fuse pusher finger section in response to the first handle section being moved relative to the second handle section.

A further embodiment of any of the foregoing embodiments of the present disclosure includes that the first tool arm and the second tool arm are identical.

A further embodiment of any of the foregoing embodiments of the present disclosure includes a hinge-pin fastener that passes through the second tool arm and the first tool arm along the axis.

A further embodiment of any of the foregoing embodiments of the present disclosure includes that the first fuse holder spreader finger section and the second fuse holder spreader finger section each comprise two fingers.

A further embodiment of any of the foregoing embodiments of the present disclosure includes that the first fuse pusher finger section and the second fuse pusher finger section each comprise two fingers.

A further embodiment of any of the foregoing embodiments of the present disclosure includes an interfering structure on at least one of the first handle section and the second handle section that operate as a stop to limit movement of the first handle section with respect to the second handle section.

A further embodiment of any of the foregoing embodiments of the present disclosure includes a grip surface on the first handle section and the second handle section.

A further embodiment of any of the foregoing embodiments of the present disclosure includes that the first fuse holder spreader finger section and the second fuse holder spreader finger section each comprise two fingers and the first fuse pusher finger section and the second fuse pusher finger section each comprise two fingers.

A further embodiment of any of the foregoing embodiments of the present disclosure includes that the first fuse holder spreader finger section and the second fuse holder spreader finger section are outboard of the first fuse pusher finger section and the second fuse pusher finger section.

A further embodiment of any of the foregoing embodiments of the present disclosure includes that the first fuse pusher finger section and the second fuse pusher finger section each form a hook to capture a fuse.

A further embodiment of any of the foregoing embodiments of the present disclosure includes that the hook comprises a ramp section to push the fuse away from a surface of a circuit card assembly.

A tool for the removal or installation of a fuse according to one disclosed non-limiting embodiment of the present disclosure includes a first tool arm comprising a first handle section from which extends a first tool arm first fuse holder spreader finger, a first tool arm first fuse pusher finger, a first tool arm second fuse pusher finger and a first tool arm second fuse holder spreader finger; and a second tool arm pivotally mounted to the first tool arm about an axis, the second tool arm comprising a second handle section from which extends a second tool arm first fuse holder spreader finger, a second tool arm first fuse pusher finger, a second tool arm second fuse pusher finger and a second tool arm second fuse holder spreader finger, the second tool arm first fuse holder spreader finger adjacent to the first tool arm first fuse holder spreader finger, the second tool arm first fuse pusher finger adjacent to the first tool arm first fuse pusher finger, the second tool arm second fuse pusher finger adjacent to the first tool arm second fuse pusher finger, the second tool arm second fuse holder spreader finger, adjacent to the first tool arm second fuse holder spreader finger.

A further embodiment of any of the foregoing embodiments of the present disclosure includes that the second tool arm first fuse holder spreader finger pivots away from the first tool arm first fuse holder spreader finger and the second tool arm second fuse holder spreader finger pivots away from the first tool arm second fuse holder spreader finger in response to the first handle section being moved toward the second handle section.

A further embodiment of any of the foregoing embodiments of the present disclosure includes that the second tool arm first fuse pusher finger pivots toward the first tool arm first fuse pusher finger and the second tool arm second fuse pusher finger pivots toward the first tool arm second fuse pusher finger in response to the first handle section being moved toward the second handle section.

A method for removing a fuse according to one disclosed non-limiting embodiment of the present disclosure includes locating a tool adjacent to a circuit card assembly and around a fuse mounted within a fuse holder spring clip; and pivoting a first handle section toward the second handle section of the tool such that a fuse holder spreader section of the tool spreads the fuse holder spring clip and a fuse pusher section of the tool pushes the fuse away from the circuit card assembly.

A further embodiment of any of the foregoing embodiments of the present disclosure includes that the fuse pusher section of the tool is at least partially supported upon a surface of the circuit card assembly.

A further embodiment of any of the foregoing embodiments of the present disclosure includes that the fuse pusher section of the tool is contoured to capture the fuse.

A further embodiment of any of the foregoing embodiments of the present disclosure includes limiting movement of the fuse holder spreader section in response to the first handle section and the second handle section pivoting together until a stop is reached.

A further embodiment of any of the foregoing embodiments of the present disclosure includes engaging the fuse holder spreader section with an edge of the spring clip terminal.

A further embodiment of any of the foregoing embodiments of the present disclosure includes that pivoting the first handle section and the second handle section results in the fuse pusher section pivoting in the first direction and the fuse holder spreader section pivoting in a second direction opposite the first direction.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
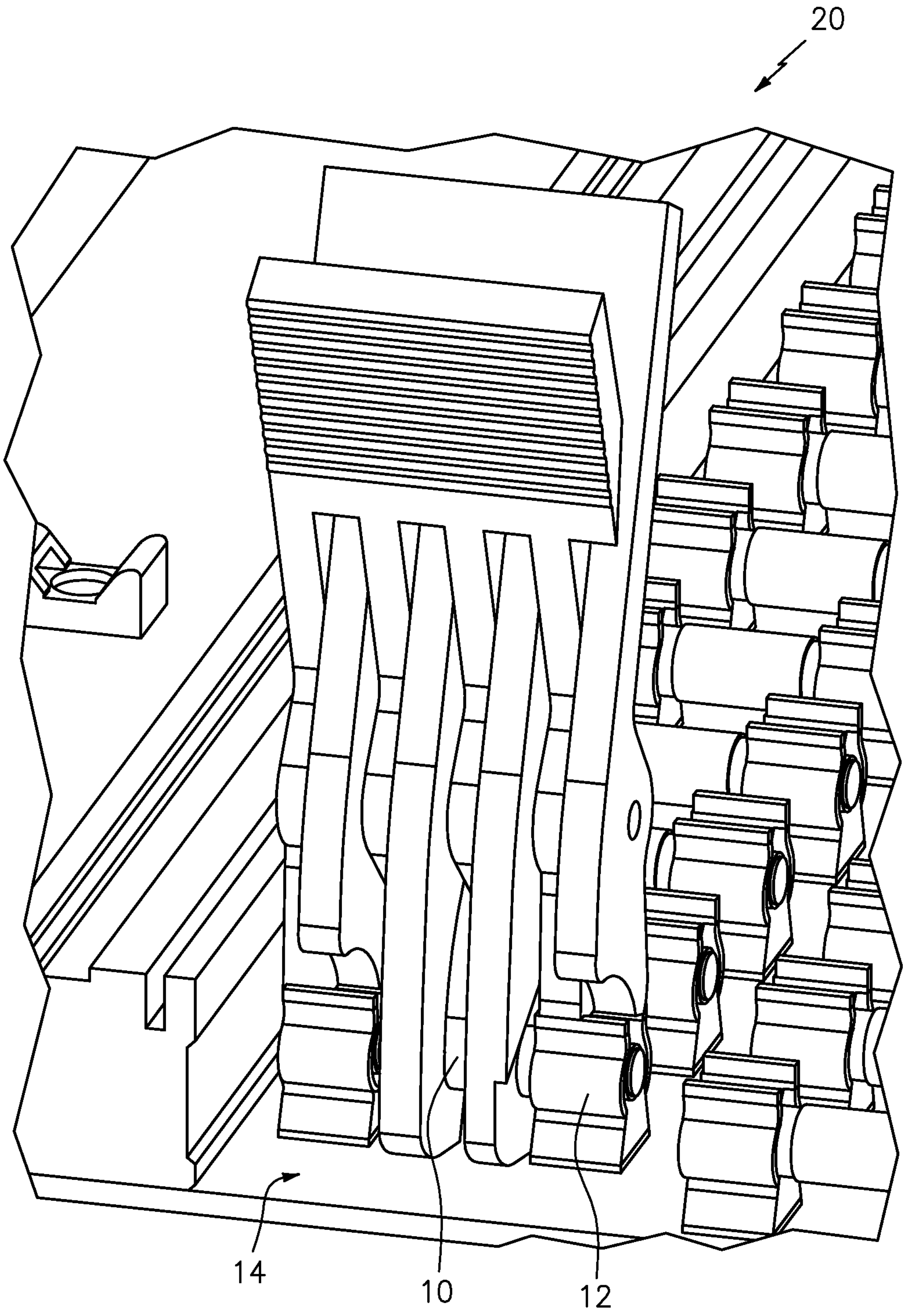
FIG. 1 is a perspective view of a tool engaged with a fuse in a fuse holder spring clip of a circuit card assembly.

FIG. 1 schematically illustrates a tool 20. The tool 20 facilitates installation and removal of a fuse 10, e.g., a cartridge or barrel type fuse, from a fuse holder spring clip 12 in a circuit card assembly 14. The fuse 10 is retained within the fuse holder spring clip 12 and typically physically close to others. The tool 20 may be additively manufactured or manufactured of electrically dissipative, electrically non-conductive, other non-conductive materials.

Figure 2:
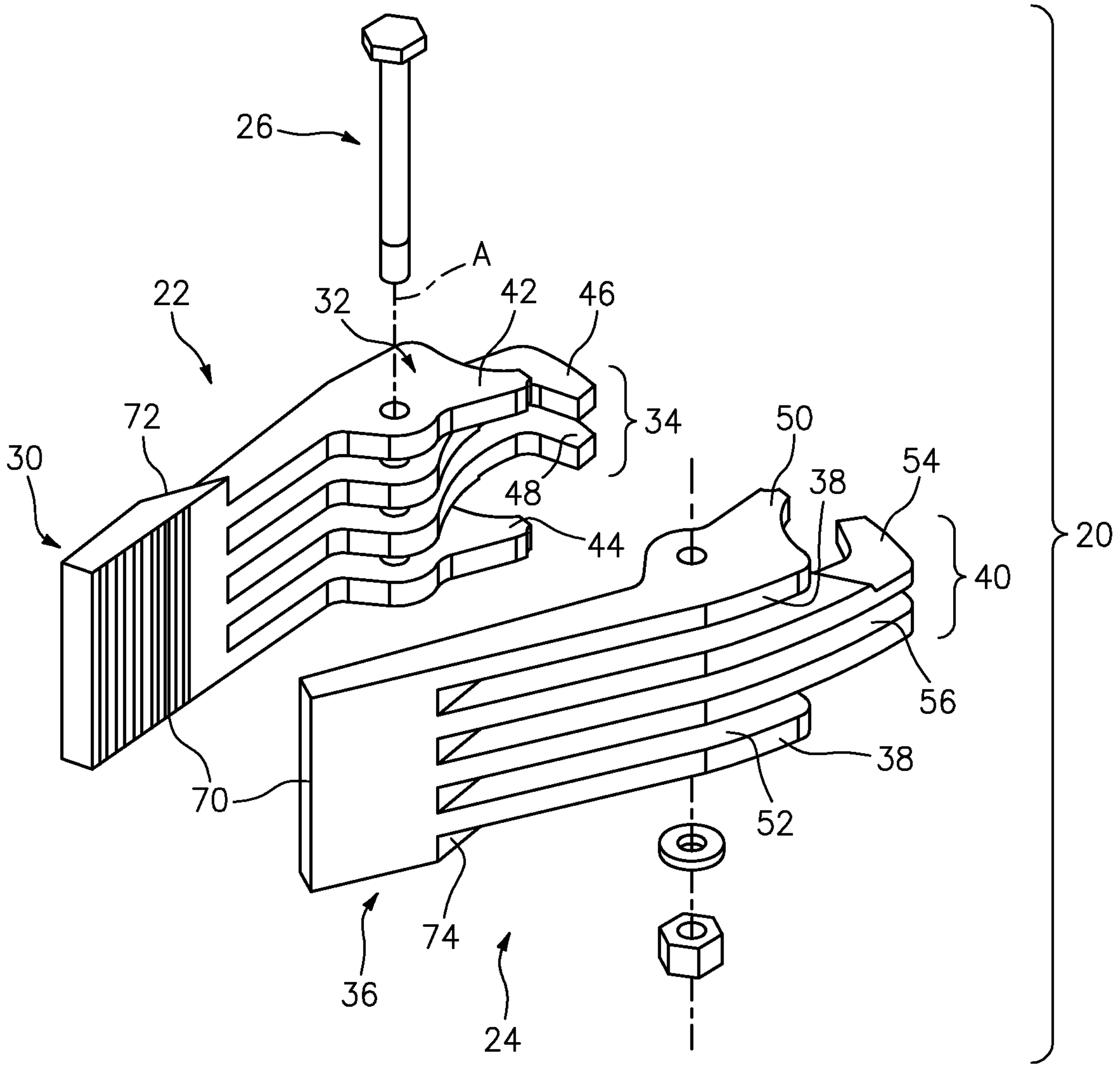
FIG. 2 is an exploded view of the tool.

With reference to FIG. 2, the tool 20 includes a first tool arm 22, a second tool arm 24 and a hinge-pin fastener 26 such as a bolt. The first tool arm 22 may be identical to the second tool arm 24. The second tool arm 24 is pivotally mounted to the first tool arm 22 about an axis A which can be defined by the fastener 26.

The first tool arm 22 includes a first handle section 30, a first fuse holder spreader finger section 32 and a first fuse pusher finger section 34. The second tool arm 24 includes a second handle section 36, a second fuse holder spreader finger section 38 and a second fuse pusher finger section 40.

The first fuse holder spreader finger section 32 includes a first tool arm first fuse holder spreader finger 42 and a first tool arm second fuse holder spreader finger 44. The first fuse pusher finger section 34 includes a first tool arm first fuse pusher finger 46 and a first tool arm second fuse pusher finger 48. The first tool arm first fuse holder spreader finger 42 and the first tool arm second fuse holder spreader finger 44 are, in this configuration, outboard of the first tool arm first fuse pusher finger 46 and the first tool arm second fuse pusher finger 48.

The second fuse holder spreader finger section 38 includes a second tool arm first fuse holder spreader finger 50 and a second tool arm second fuse holder spreader finger 52. The second fuse pusher finger section 40 includes a second tool arm first fuse pusher finger 54 and a second tool arm second fuse pusher finger 56. The second tool arm first fuse holder spreader finger 50 and the second tool arm second fuse holder spreader finger 52 are, in this configuration, outboard of the second tool arm first fuse pusher finger 54 and the second tool arm second fuse pusher finger 56.

Figure 3:
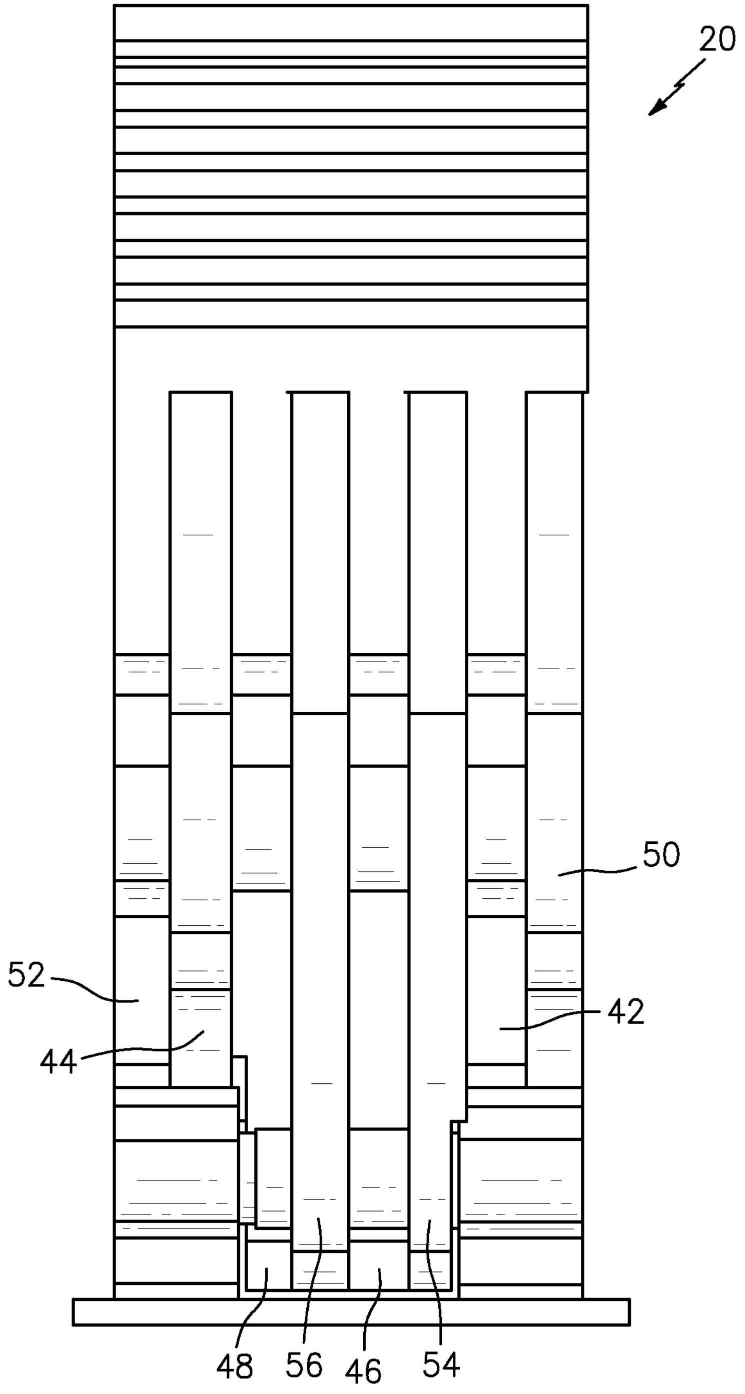
FIG. 3 is a side view of the tool engaged with a fuse in a fuse holder spring clip of a circuit card assembly.

The second tool arm 24 is pivotally assembled to the first tool arm 22, such that the fingers 50, 42, 54, 46, 56, 48, 52 and 44 are interleaved (FIG. 3). The second tool arm first fuse holder spreader finger 50 is adjacent to the first tool arm first fuse holder spreader finger 42. The first tool arm first fuse holder spreader finger 42 is adjacent to the second tool arm first fuse pusher finger 54. The second tool arm first fuse pusher finger 54 is adjacent to the first tool arm first fuse pusher finger 46. The first tool arm first fuse pusher finger 46 is adjacent to the second tool arm second fuse pusher finger 56. The second tool arm second fuse pusher finger 56 is adjacent to the first tool arm second fuse pusher finger 48. The first tool arm second fuse pusher finger 48 is adjacent to the second tool arm second fuse holder spreader finger 52. The second tool arm second fuse holder spreader finger 52 is adjacent to the first tool arm second fuse holder spreader finger 44. In other words, the fingers of one tool arm define spaces between the fingers, and the fingers of the other tool arm pivot through these spaces.

Figure 4:
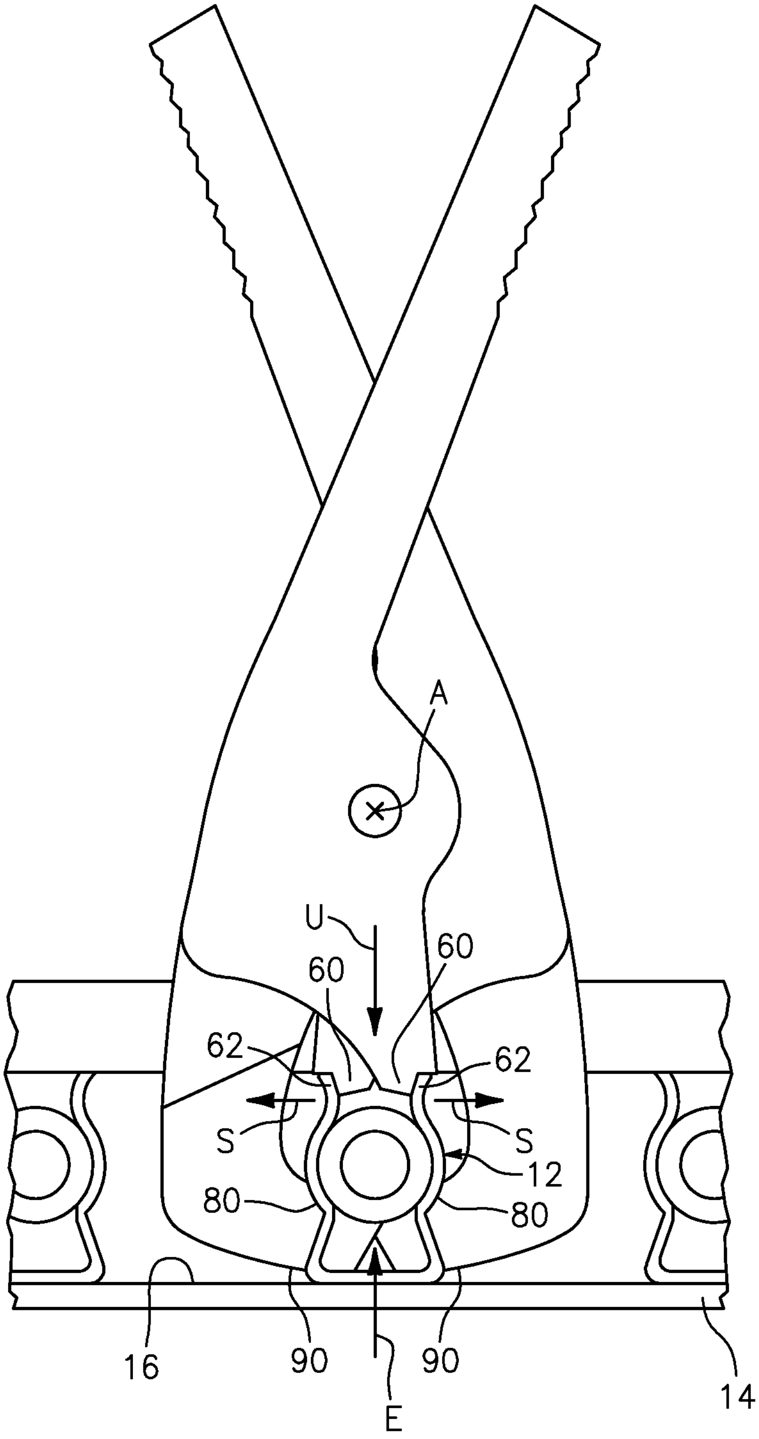
FIG. 4 is a schematic cross-sectional view of the tool engaged with a fuse in a fuse holder spring clip of a circuit card assembly.

The first tool arm first fuse holder spreader finger 42, the first tool arm second fuse holder spreader finger 44, the second tool arm first fuse holder spreader finger 50 and the second tool arm second fuse holder spreader finger 52 may each include a step 60 or other interface that facilitates engagement with an edge 62 of the fuse holder spring clip 12 (FIG. 4).

The first handle section 30 and the second handle section 36 provide rigidity and uniformity (in force and displacement) in the pivoting action of the fuse holder spreader fingers with respect to the fuse pusher fingers so as to minimize the complexity. The first handle section 30 and the second handle section 36 may each include a grip surface 70 to facilitate purchase on the tool. The grip surface 70 may include a texture such as ribs.

The second fuse holder spreader finger section 38 pivots away from the first fuse holder spreader finger section 32 and the second fuse pusher finger section 40 pivots toward the first fuse pusher finger section 34 in response to the first handle section 30 and the second handle section 36 being squeezed together. The typical force required to squeeze the tool 20 may be about, for example, 2-3 pounds-force.

An interfering structure 72 such as a step on at least one of the first handle section 30 and an interfering structure 74 on the second handle section 36 come into contact to operate as a stop to limit pivotal movement of the first tool arm 22 with respect to the second tool arm 24. Over spreading of the fuse holder spring clip 12 is thereby avoided.

The fingers of the second fuse holder spreader finger section 38 pivot away from the fingers of the first fuse holder spreader finger section 32 to generate a separation force (arrows S; FIG. 4) that spreads the fuse holder spring clip 12. This reduces frictional forces on the fuse 10 to facilitate extraction.

The fingers of the second fuse pusher finger section 40 pivot toward the fingers of the first fuse pusher finger section 34 to capture the fuse 10 and provide an extraction force (arrow E; FIG. 4). The extraction force (arrow E; FIG. 4) may be at least partially opposed by the downward force (arrow U; FIG. 4) toward the circuit card assembly 14 by the fingers of the second fuse holder spreader finger section 38 and the fingers of the first fuse holder spreader finger section 32 spreading the fuse holder spring clip 12. That is, the extraction is facilitated by the inner contours 80 of the fingers of the second fuse pusher finger section 40 and the fingers of the first fuse pusher finger section 34 which form a ramped surface to push the fuse 10 as the fingers of the second fuse holder spreader finger section 38 and the fingers of the first fuse holder spreader finger section 32 are pulled into the fuse holder spring clip 12. The outer contours 90 of the fingers of the second fuse pusher finger section 40 and the fingers of the first fuse pusher finger section 34 may also be supported on a surface 16 of the circuit card assembly 14 to facilitate stability.

Figure 5:
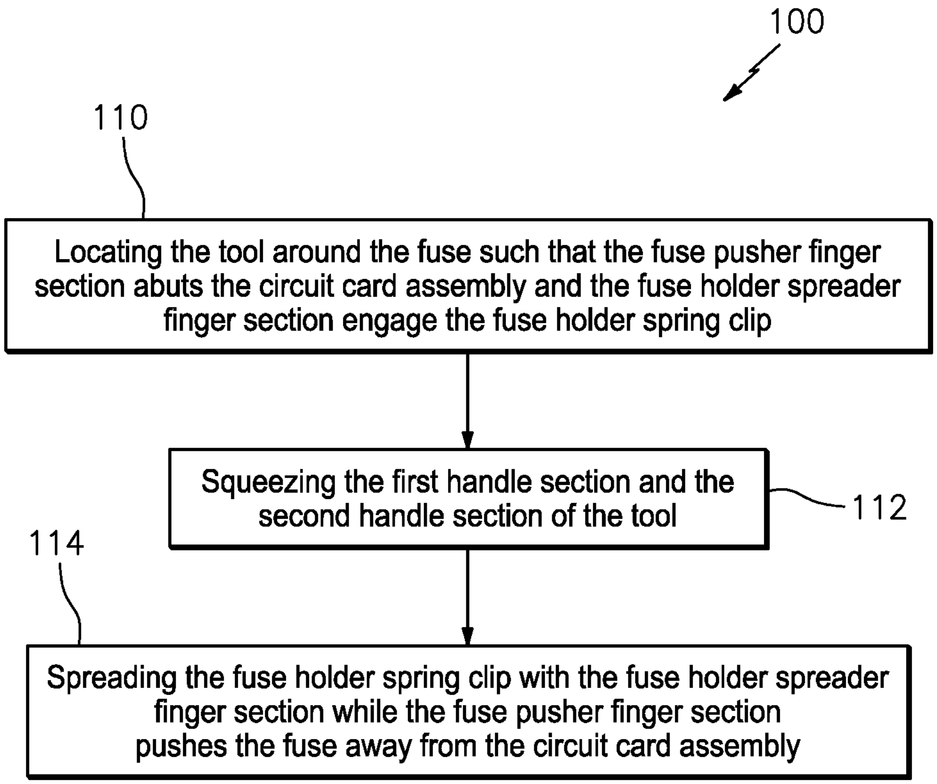
FIG. 5 is a block diagram of a method for removing a fuse using the tool.

With reference to FIG. 5, a method 100 for removing the fuse 10 includes locating the tool 20 around the fuse 10 that is mounted within the fuse holder spring clip 12 such that the first and second fuse pusher finger section 34, 40 abut the circuit card assembly 14 and the first and second fuse holder spreader finger section 32, 38 engage the fuse holder spring clip 12 (110).

The first handle section 30 and the second handle section 36 of the tool 20 are then squeezed together (112). The first and second fuse holder spreader finger section 32, 38 spreads the fuse holder spring clip 12 while the first and second fuse pusher finger section 34, 40 pushes the underside of the fuse 10 away from the circuit card assembly 14 (114).

Installation of the fuse 10 is also facilitated by locating a fuse in the first and second fuse pusher finger section 34, 40 then spreading the fuse holder spring clip 12 with the first and second fuse holder spreader finger section 32, 38.

The tool 20 reduces the pulling force required to extract the fuse 10 as the forces acting on fuse 10 and the fuse holder spring clip 12 oppose each other after closing of the tool 20. The tool 20 is portable and adaptable to different fuse types. The tool 20 also addresses the ergonomic concerns regarding the high force heretofore required for installation and removal of a fuse.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method for removing a fuse, comprising:

locating a tool adjacent to a circuit card assembly and around a fuse mounted within a fuse holder spring clip;

the tool comprising:

a first tool arm comprising a first handle section from which extends a first tool arm first fuse holder spreader finger, a first tool arm first fuse pusher finger, a first tool arm second fuse pusher finger and a first tool arm second fuse holder spreader finger; and a second tool arm pivotally mounted to the first tool arm about an axis with a single hinge-pin fastener that passes through the first tool arm and the second tool arm along the axis, the second tool arm comprising a second handle section from which extends a second tool arm first fuse holder spreader finger including a second tool arm first fuse holder spreader finger step, a second tool arm first fuse pusher finger, a second tool arm second fuse pusher finger and a second tool arm second fuse holder spreader finger including a second tool arm second fuse holder spreader finger step; and pivoting the first handle section toward the second handle section of the tool such that a fuse holder spreader section of the tool spreads the fuse holder spring clip by engaging the second tool arm first fuse holder spreader finger step with a corresponding edge of the fuse holder spring clip and the second tool arm second fuse holder spreader finger step with a corresponding edge of the fuse holder spring clip and a fuse pusher section of the tool pushes the fuse away from the circuit card assembly.

2. The method as recited in claim 1, wherein the fuse pusher section of the tool is at least partially supported upon a surface of the circuit card assembly.

3. The method as recited in claim 1, wherein the fuse pusher section of the tool is contoured to capture the fuse.

4. The method as recited in claim 1, further comprising limiting movement of the fuse holder spreader section in response to the first handle section and the second handle section pivoting together until a stop is reached.

5. The method as recited in claim 1, wherein pivoting the first handle section and the second handle section results in the fuse pusher section pivoting in a first direction and the fuse holder spreader section pivoting in a second direction opposite the first direction.

* * * * *